United States Patent [19]

Cordua

[11] Patent Number: 5,632,465
[45] Date of Patent: May 27, 1997

[54] VALVE ASSEMBLY

[76] Inventor: Paul M. Cordua, 556 S. Mirage, Lindsay, Calif. 93247

[21] Appl. No.: 646,056

[22] Filed: May 7, 1996

Related U.S. Application Data

[63] Continuation of Ser. No. 935,986, Aug. 27, 1992, abandoned, which is a continuation of Ser. No. 604,443, Oct. 29, 1990, abandoned.

[51] Int. Cl.$^6$ ................................................ F16K 31/385
[52] U.S. Cl. ........................ 251/46; 251/30.02; 251/61.1
[58] Field of Search .................... 251/30.02, 46, 251/61.1

[56] References Cited

U.S. PATENT DOCUMENTS

| | | |
|---|---|---|
| 1,118,649 | 11/1914 | Halter . |
| 2,407,761 | 9/1946 | McPherson .................. 251/46 |
| 2,572,175 | 10/1951 | McPherson . |
| 2,679,378 | 5/1954 | Uhler . |
| 3,083,943 | 4/1963 | Stewart, Jr. et al. . |
| 3,286,977 | 11/1966 | Miottel . |
| 3,693,611 | 9/1972 | Ploss . |
| 4,198,029 | 4/1980 | Johnson .................. 251/61.1 |
| 4,624,442 | 11/1986 | Duffy et al. .................. 251/61.1 |

*Primary Examiner*—Gerald A. Michalsky
*Attorney, Agent, or Firm*—Worrel & Worrel

[57] ABSTRACT

A valve assembly having a housing with an inlet passage and an outlet passage communicating with a valve chamber through a substantially hemispherical valve seat; a valve member mounted in the valve chamber of the housing for movement between a closed attitude, substantially preventing the flow of fluid from the inlet passage to the outlet passage, and an opened attitude, defining a path of fluid flow interconnecting the inlet passage and the outlet passage; and a mechanism for moving the valve member between said closed and opened attitudes.

2 Claims, 4 Drawing Sheets

VALVE ASSEMBLY

This patent application is a continuation patent application of patent application Ser. No. 07/935,986, filed Aug. 27, 1992, now abandoned, and which was itself a continuation patent application of patent application Ser. No. 07/604,443, filed Oct. 29, 1990, also now abandoned.

BACKGROUND OF THE INVENTION

1. Field of the Invention

The present invention relates to a valve assembly and more particularly to a such a valve assembly which is operable dependably and efficiently to control the flow of fluids through a fluid system initiating and terminating the flow of fluid in response to a predetermined command with little or no pressure loss when in an opened condition and without the leakage associated with prior art valve assemblies when in a closed condition.

2. Description of the Prior Art

Fluid control valves form an essential part of virtually all fluid systems. A broad operational objective of such valves is to form an absolute seal preventing flow along a fluid line until, in accordance with a predetermined command, it is desired to permit fluid to pass along the line. When the initiation of such fluid flow is desired, the broad operational objective is instantaneously to open to permit the flow of fluid along the line for the preselected period of time and thereafter instantaneously to close instantaneously terminating the flow of fluid along a line. Upon such closure, it is desired that there be no leakage of fluid along the line due to fluid passing through the valve.

While these broad operational objectives are both simple and universal, full achievement of the objectives has not heretofore been obtained.

Conventional valves have heretofore been of three main types. A conventional gate valve is typically manually operated and is composed simply of a conduit having a gate member which is moved along a path at right angles to the longitudinal axis of the conduit reaching a closed position in which it is intended that the gate member fully occlude the fluid passage. Such gate valves have the operational advantage of causing little or no loss of fluid pressure when in a fully opened condition since, except for turbulence, the fluid passage therethrough is essentially entirely unobstructed. However, such valves are chronically subject to fluid leakage through the gate member when otherwise in a closed condition. Furthermore, their operation does not lend itself to satisfactory performance when operated other than manually.

A second general type of conventional valve is a conventional diaphragm valve. Such valves are characterized by a wall disposed in the fluid passage at the site of the valve to divert the fluid flow along a course at right angles to the normal fluid passage and against a diaphragm. The diaphragm, when in a normally closed attitude, is intended sealing to engage the upper edge of the wall to prevent the fluid from passing about the wall and back along its course. The diaphragm is typically retained in a closed condition by bleeding fluid from the upstream side of the valve to pressurize the chamber above the diaphragm overriding normal fluid pressure in a passage and retaining the valve in a closed condition. When it is desired to open the valve, the fluid pressure in the chamber above the diaphragm is relieved therefrom so that the pressure within the normal fluid passage becomes greater than that above the diaphragm thereby causing the diaphragm to involute moving away from the upper edge of the wall and permitting fluid to flow in the passage over the top of the wall and back along the normal fluid stream. Such conventional diaphragm valves are compatible with automatic operation systems, but also suffer from fluid leakage when in the closed condition. More disturbingly, such valves create a rather substantial pressure loss when in a fully opened condition due to the wall obstructing the fluid passage and the inherent constriction of the fluid passage through the valve.

Still another type of conventional valve is a spherical diaphragm valve in which the fluid passage through the valve is substantially unobstructed except for a rather low wall opposite the diaphragm and engaged by and cooperatively operable with a larger diaphragm substantially in the manner heretofore described to control the flow of fluid along the fluid passage. Such spherical diaphragm valves are advantageous when compared to conventional diaphragm valves in that a comparatively small pressure loss is caused when the valve is in an opened condition because of the relatively low profile wall as compared with a conventional diaphragm valve. Conversely, such spherical diaphragm valves are chronically subject to fluid leakage because the diaphragm is largely unsupported when in a closed condition. Thus, while counterbalancing fluid pressure above the diaphragm is substantial, the fluid pressure within the main fluid passage bears against the diaphragm and tends to displace it from the low wall so as to cause leakage thereby. Thus, it will be seen that all conventional valves fail to meet the optimum operational objectives of fluid valves.

Therefore, it has long been known that it would be desirable to have a valve assembly which substantially achieves the optimum operational objectives of a fluid valve in that when in a normally closed condition the valve forms a fluid tight seal against fluid passing therebeyond along the fluid line permitting no leakage; which is instantaneously responsive to a predesignated command to open to a fully opened condition such that little or no pressure loss is caused; and which, upon receipt of the predesignated command, operates instantaneously again to close substantially completely to seal the fluid line through the valve with substantially no fluid leakage.

SUMMARY OF THE INVENTION

Therefore, it is an object of the present invention to provide an improved valve assembly.

Another object is to provide such a valve assembly which can be employed in virtually any fluid system to control the flow of virtually any fluid therealong operating dependably and efficiently substantially to perform the optimum operational objectives for the valve.

Another object is to provide such a valve assembly which is particularly well suited to operation in a fluid system such as an automatic irrigation system responsive to a predesignated command to assume an opened attitude for a selected period of time and thereafter to be operated to assume an entirely sealed attitude with substantially no fluid leakage beyond the valve when in a closed attitude.

Another object is to provide such a valve assembly which when in an opened attitude defines a fluid passage therethrough having an effective area at any given point therealong which is in no sense constricted from the area of the fluid line itself so as to cause substantially no pressure loss when in an opened attitude.

Another object is to provide such a valve assembly which is operable selectively to release fluid at precisely the rate of flow desired including extremely low rates of flow.

Another object is to provide such a valve assembly which can be set to release fluid therethrough at an extremely low rate of flow without the "valve chatter" associated with conventional valves.

Another object is to provide such a valve assembly which fully supports the operative components thereof in both opened and closed attitudes in such a fashion that little or no wear is incurred by such operational components in moving between the opened and closed attitudes.

Another object is to provide such a valve assembly which is fully compatible with conventional fluid systems making it adaptable to substantially all such fluid systems.

Further objects and advantages are to provide improved elements and arrangements thereof in an apparatus for the purpose described which is dependable, economical, durable and fully effective in accomplishing its intended purpose.

These and other objects and advantages are achieved, in the preferred embodiment of the valve assembly of the present invention, in a valve housing having a substantially hemispherical valve seat communicating with entrance and discharge passages and which cooperates with an internal diaphragm which, in a closed attitude, facingly engages the hemispherical surface of the housing in fluid sealing relation to the annuluses of the entrance and discharge passages and which, in an opened attitude, defines a cross-sectional area substantially not smaller than the cross-sectional areas of the entrance and discharge passages.

DESCRIPTION OF THE PREFERRED EMBODIMENT

Figure 1:
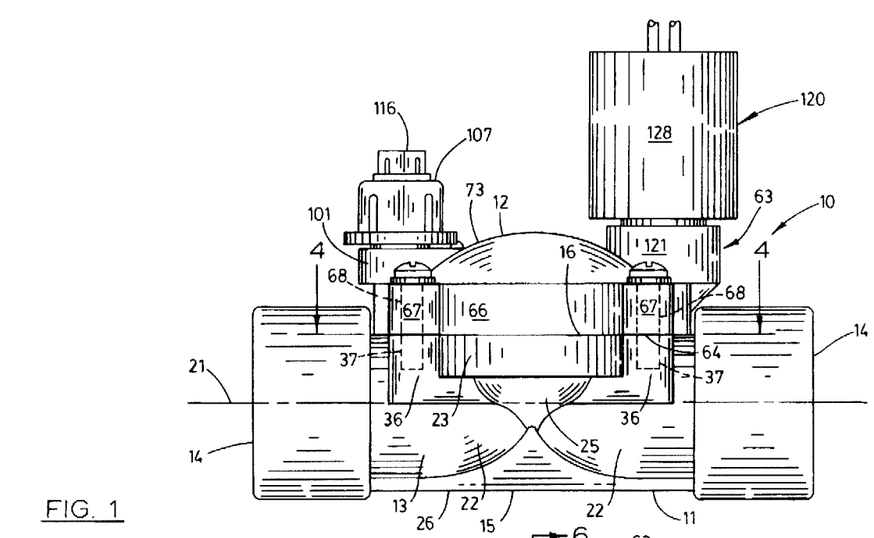
FIG. 1 is a side elevation of the valve assembly of the present invention.

Referring more particularly to the drawings, the valve assembly of the present invention is generally indicated by the numeral 10 in FIG. 1. The valve assembly can be employed in a variety of environments selectively to control the flow of fluids through a fluid system. For illustrative convenience, the valve assembly will be described herein as employed in an irrigation system such as a typical sprinkler system used to irrigate lawns, flower beds, and the like. It will be apparent, however, that the valve assembly can be employed in any fluid system wherein it is necessary to initiate and subsequently terminate the flow of fluid along a line. In point of fact, the valve assembly has particular utility in commercial fluid systems where the avoidance of pressure loss and fluid leakage may have particular importance.

As shown in FIG. 1, the valve assembly 10 has a valve housing or body 11 which includes a diaphragm housing 12.

The valve body has a bottom or main body portion 13 having opposite end portions 14, a bottom surface 15 and a top surface 16.

Figure 2:
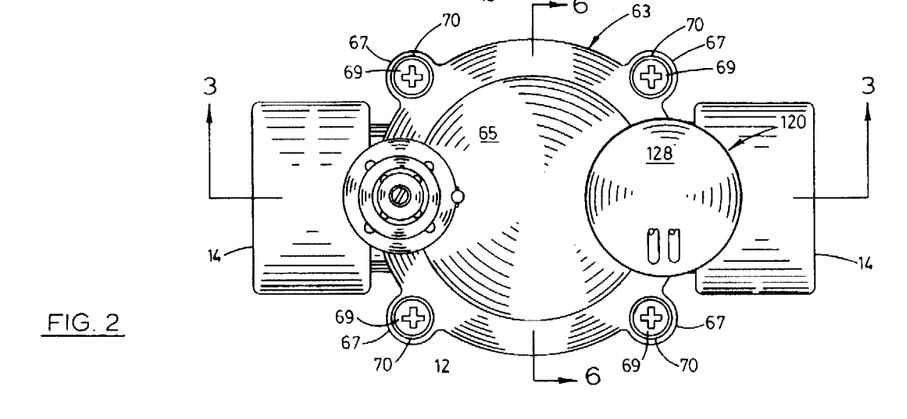
FIG. 2 is a top plan view of the valve assembly of FIG. 1.
Figure 3:
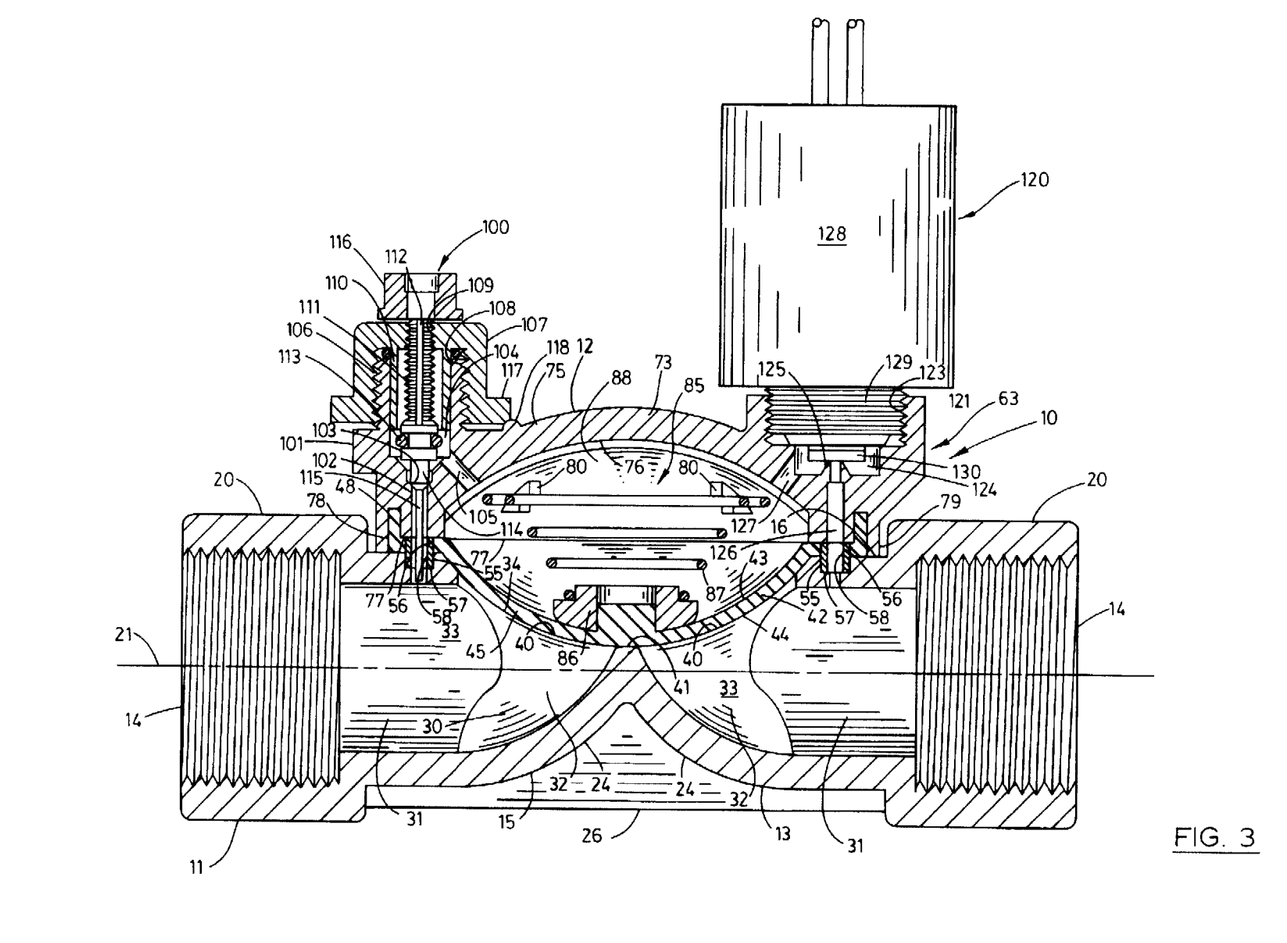
FIG. 3 is a somewhat enlarged, longitudinal vertical section taken on line 3—3 in FIG. 2 and showing the diaphragm of the valve assembly in a closed attitude.

Each opposite end portion 14 of the valve body 11 mounts an internally screw threaded coupling 20 of predetermined size adapted screw-threadably to be secured in fluid transferring relation to a conduit, not shown, so as to create a fluid tight path for fluid movement along the conduit through the valve assembly. The internally screw threaded couplings 20 are aligned so as to be substantially concentric to a longitudinal axis 21. The screw threaded couplings individually connect to tubular portions 22 forming integral portions of the valve body and extending generally toward each other from their respective screw threaded couplings. The screw threaded coupling 20 on the left, as viewed in FIGS. 1, 2 and 3, is sometimes referred to herein as the "inlet coupling" and the screw threaded coupling 20 on the right, as viewed in FIGS. 1, 2 and 3, is sometimes referred to herein as the "outlet coupling." The tubular portions extend into communication with a lower portion 23 of the diaphragm housing 12. The tubular portions have lower walls 24 which curve upwardly to join a hemispherical lower wall 25 of the lower portion 23 of the diaphragm housing 12. A ridge 26 extends along the lower walls of the tubular portions between the screw threaded couplings 20.

As will hereinafter be described in greater detail, the valve assembly has a main fluid passage 30 extending therethrough interconnecting the screw threaded couplings 20 in fluid transferring relation. Each of the tubular portions 22 has a substantially cylindrical portion 31 extending from its respective adjacent coupling 20 to a generally upwardly curving transitional portion 32 of the main fluid passage. The cylindrical portion 31 and transitional portion 32 of each tubular portion 22 is defined by an internal surface 33. The lower portion 23 of the diaphragm housing 12 has a substantially hemispherical surface 34 bounded by an annular surface 35 extending thereabout. The portion of the main fluid passage to the left of the hemispherical surface 34, as viewed in FIG. 3, is sometimes referred to herein as the "main inlet passage." The portion of the main fluid passage to the right of the hemispherical surface 34, as viewed in FIG. 3, is sometimes referred to herein as the "main outlet passage." Four ears 36 are mounted on and form an integral part of the diaphragm housing individually extending outwardly from the annular surface 35 thereof and each having an internally screw threaded bolt hole 37.

Figure 4:
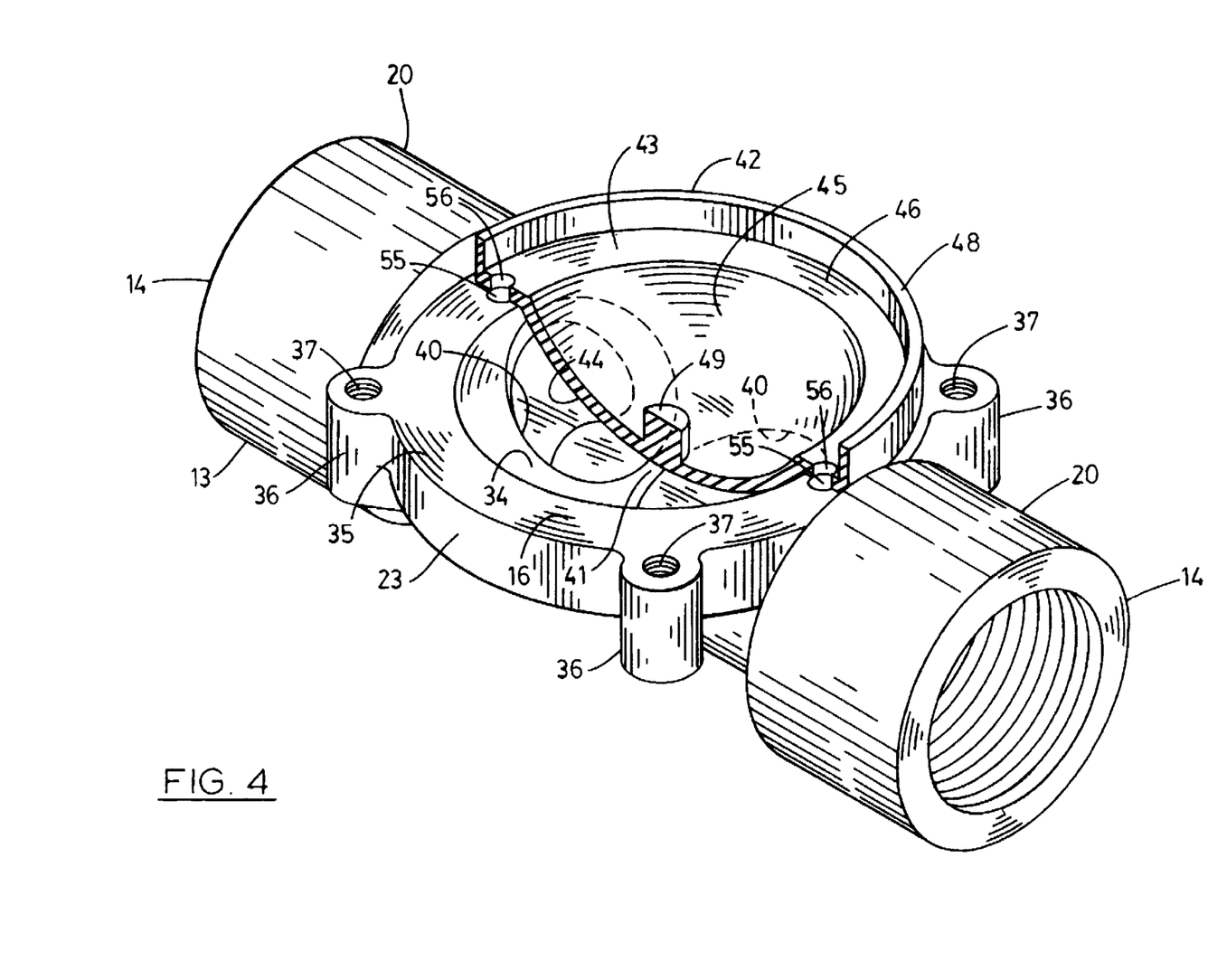
FIG. 4 is a fragmentary perspective view of the main body portion of the valve assembly showing the diaphragm fragmentarily therein in a closed attitude.

As can best be seen in FIGS. 3 and 4, each transitional portion 32 of the main fluid passage 30 communicates with the hemispherical surface 34 of the lower portion 23 of the diaphragm housing 12 at smooth annulus 40 at the juncture of the internal surface 33 and the hemispherical surface 34. The annuluses 40 of the respective tubular portions 22 are separated from each other by a web or narrow portion 41 coincident with the hemispherical surface 34 and forming a integral part thereof. The web forms a smooth and continuous surface with the hemispherical surface 34, or is, in other words, part of the hemisphere.

A valve member or diaphragm 42 of resilient material, such as synthetic rubber or the like, is mounted in the diaphragm housing 12. The diaphragm has an upper surface 43 and an opposite lower surface 44. The diaphragm has a concavo-convex portion 45 which, when seated as fragmentarily shown in FIG. 4, is so configured that its lower surface 44 facingly engages the hemispherical surface 34 in rested relation thereon. The diaphragm has an annular portion 46 which is fitted in facing engagement with the annular surface 35 of the lower portion of the diaphragm housing. An annular wall 48 extends about the diaphragm in substantially right angular relation to the annular portion 46 thereof. A spring projection or boss 49 is mounted on and forms an integral part of the diaphragm on the upper surface 43 thereof centrally located within the concavo-convex portion 45.

Referring more particularly to FIGS. 3 and 4, a countersunk orifice 55 extends through each tubular portion 22 into communication with the substantially cylindrical portion 31 thereof of the main fluid passage 30. An orifice 56 of the same diameter as the largest diameter of the counter sunk orifice 55 is provided in the annular portion 46 of the diaphragm in alignment with each of the countersunk orifices 55. A dowel pin 57, having an axial passage 58 of the same diameter as that of the smaller of the countersunk orifices, is received in each of the aligned larger of the countersunk orifices 55 and orifice 56 of the diaphragm aligned therewith.

The valve assembly 10 has a top body portion 63 mounted on the valve body 11, as hereinafter to be described. The top body portion has, generally, a bottom surface 64 and an opposite upper surface 65. The top body portion has a peripheral surface 66 from which extend four ears 67 disposed in a pattern precisely corresponding to the ears 36 of the lower portion 23 of the diaphragm housing 12. Similarly, each of the ears has a bolt hole 68 extending therethrough in precise alignment with the internally screw threaded bolt hole 37 of the ear 36 corresponding thereto. A plurality of bolts 69 are individually extended through washers 70, slidably received through the bolt hole 68 and screw-threadably secured in the internally screw threaded bolt holes 37 to mount the top body portion 63 in fluid tight, sealing relation on the lower portion 23 so as to form a fluid tight diaphragm housing 12.

A top body portion 63 has an upper portion 73 of the diaphragm housing 12 including a hemispherical upper wall 75 having a hemispherical pressure or interior surface 76, best shown in FIG. 3. The top body portion has an annular surface 77 in which is formed an annular groove 78 in which is received the annular wall 48 of the diaphragm 42 in fluid sealing relation. The top body portion has an annular outer wall 79 which facingly engages the annular wall 48 of the diaphragm extending downwardly into abutted engagement with the annular surface 35 of the lower portion 23 of the diaphragm housing 12. Several spring locators, 80 are mounted on the interior surface 76 of the hemispherical upper wall 75 of the upper portion 73 of the diaphragm housing 12.

As shown in FIG. 3, a spring assembly 85 is operably mounted within the diaphragm housing. The spring assembly includes a compression spring mount 46 fitted on the spring projection 49 of the diaphragm 42. A substantially conical compression spring 87 is captured between the spring locators 80 and the compression spring mount 86 in fitted relation. The compression spring resiliently retains the diaphragm in the closed attitude or position shown in FIG. 3. For purposes of descriptive convenience, it will be understood that the area defined by the upper surface 43 of the concavo-convex portion 45 of the diaphragm and the hemispherical interior surface 76 of the hemispherical upper wall 75 forms a pressure chamber or spring chamber 88.

The valve assembly 10 has a fluid supply assembly, mechanism or manual control assembly 100, best shown in FIG. 3. The manual control assembly itself is substantially conventional. However, for purposes of a full understanding of the valve assembly of the present invention, the manual control assembly is described in substantial detail herein. The manual control assembly has a manual control housing 101 forming an integral part of the top body portion 63 and having a vertical fluid passage 102 extending inwardly thereof from the bottom surface 64 to a valve seat 103. The valve seat constitutes the lower limit of a fluid chamber 104 which communicates with the top surface 65 of the top body portion 63. A diagonal fluid passage 105 of predetermined diameter interconnects the fluid chamber 104 and the spring chamber 88. The countersunk orifice 55, axial passage 58, vertical fluid passage 102, fluid chamber 104 and diagonal fluid passage 105 on the left, as viewed in FIG. 3, are sometimes referred to herein as the "inlet control passage." The manual control housing has an externally screw threaded nipple 106 facing upwardly therefrom.

A bleed port housing 107 is mounted on the externally screw threaded nipple 106. The bleed port housing has internal screw threads 108 which are screw-threadably secured on the externally screw threaded nipple to mount the bleed port housing in the position described. A central screw threaded bore 109 extends inwardly of the bleed port housing in communication with the interior of the externally screw thread nipple 106. The bleed port housing has an internal sleeve 110 extending inwardly of the externally screw threaded nipple. A bleed port screw 111 is screw-threadably secured in the central screw threaded bore 109 and has a slot 112 running longitudinally thereof along the exterior of the bleed port screw.

An O-ring assembly 113 is mounted on the bleed port screw 111 and, in turn, mounts a valve member 114 positionable in fluid sealing relation in the valve seat 103 of the manual control housing 101. A metering rod 115 of predetermined outer diameter is mounted on the valve member 114 and extends through the vertical fluid passage 102 and passage 58 of the dowel pin 57. The difference in diameter between the exterior diameter of the metering rod 115 and the interior diameter of the vertical fluid passage 102 and passage 58 of the dowel pin is determined at the time of manufacture of the valve assembly and is adapted to fix the rate of fluid flow upwardly in the vertical fluid passage 102 and passage 58 as will hereinafter be described in greater detail. A bleed port knob 116 is mounted on the bleed port screw 111 externally of the bleed port housing 107.

As can best be visualized upon reference to FIG. 3, screw threading of the bleed port screw 111 in the central screw threaded bore 109 of the bleed port housing 107 permits the operator manually to move the valve member 114 and O-ring assembly 113 upwardly or downwardly. When the valve member 114 is moved into engagement with the valve seat 103, fluid cannot pass into the fluid chamber 104 from the main fluid passage 30 in that the vertical fluid passage 102 is sealed. Conversely, when the bleed port knob 116 is rotated in the opposite direction to move the bleed port screw 111 upwardly in the bleed port housing, the O-ring assembly can be positioned in sealing engagement with the lower annulus of the internal sleeve 110 of the bleed port housing 107 and simultaneously open the vertical fluid passage to allow fluid to enter the fluid chamber 104. It will be seen that upon fluid entering the fluid chamber 104 it is caused to pass along the diagonal fluid passage 105 and into the spring chamber 88.

The bleed port housing 107 has a ratchet edge 117 which is engageable with a stop 118 on the hemispherical upper wall 75. This structure is used at the time of manufacture of the valve assembly simply to lock the bleed port housing 107 in the precise desired position and to retain it in that position so that it cannot rotate with the rotation of the bleed port screw 111 by the bleed port knob 116.

Again, referring to FIG. 3, the valve assembly 10 of the present invention includes a fluid discharge assembly, mechanism or electric solenoid assembly 120. The electric solenoid assembly includes an electric solenoid housing 121 constituting an integral part of the top body portion 63. The electric solenoid housing has an internally screw threaded bore 123 which communicates with a fluid chamber 124 having a valve seat 125 positioned substantially centrally thereof. A vertical fluid passage 126 extends upwardly from the passage 58 of the dowel pin 57 on the right as viewed in FIG. 3 and communicates with the interior of the fluid chamber 124 through the valve seat 125. A diagonal fluid passage 127 of larger diameter than the diagonal fluid passage 105 of the manual control assembly 100 interconnects the fluid chamber 124 and the spring chamber 88. An electric solenoid 128 having an externally screw threaded mount 129 is mounted on the electric solenoid housing by screw threading of the mount 129 in the bore 123. The electric solenoid has a valve member 130 engageable with the valve seat 125 in sealing relation to the vertical fluid passage, as shown in FIG. 3. When the electric solenoid is operated 128, the valve member 130 is pulled away from the valve seat 125 so that a path of fluid movement is established between the spring chamber 88 and the main fluid passage 30 of the valve assembly by way of the diagonal fluid passage 127, fluid chamber 124, vertical fluid passage 126, passage 58 of the dowel pin 57 and the countersunk orifice 55. The diagonal fluid passage 127, fluid chamber 124, vertical fluid passage 126, axial passage 58 and countersunk orifice 55 on the right, as viewed in FIG. 3, are sometimes referred to herein as the "outlet control passage."

OPERATION

The operation of the described embodiment of the subject invention is believed to be clearly apparent and is briefly summarized at this point. The valve assembly 10 is mounted in a fluid system, such as a sprinkler system, in the conventional fashion with sections of conduit, not shown, individually screw-threadably received in the couplings 20 to establish a fluid tight path of fluid movement along the conduit through the valve assembly. Thus, it will be seen that the path of fluid movement communicates with the main fluid passage 30 of the valve body 11 and, thus, fluid flow along the conduit is controlled by operation of the valve assembly. More particularly, fluid flow is controlled by engagement or nonengagement of the diaphragm 42 with the hemispherical surface 34 of the lower portion 23 of the diaphragm housing 12.

The electric solenoid 128 is, in accordance with conventional practice, operably connected to a suitable electrical control system, often including a timer, operable to control operation of the electric solenoid. The valve is otherwise rendered operable by rotating the bleed port knob 116 of the manual control assembly 100 to, in turn, rotate the bleed port screw 111 to move the valve member 114 away from the valve seat 103. This establishes the path of fluid movement leading from the main fluid passage 30 on the left, as viewed in FIG. 3, into the spring chamber 88. Accordingly, when the irrigation conduit is pressurized with fluid under pressure, the fluid passes along the path previously described and into the spring chamber 88. Thus, the fluid pressure is equalized on opposite sides of the diaphragm 42, or more particularly within the tubular portion 22 on the left as viewed in FIG. 3 and within the spring chamber 88. Although the pressure is equal, the fluid pressure on the upper surface 43 of the diaphragm 42 covers a great deal more area than does the fluid pressure on the lower surface 44 of the diaphragm and, therefore, the diaphragm is retained in the closed attitude shown in FIG. 3. Additionally, of course, the spring assembly 85 assists in retaining the diaphragm positively in the closed attitude. The diaphragm is thus retained in facing engagement with the hemispherical surface 34 overlaying the annuluses 40 of the internal surfaces 33 of the tubular portions 22 so as to prevent fluid under pressure from passing beyond the annulus 40 on the left, as viewed in FIG. 3, and into the annulus 40 on the right, as viewed in FIG. 3. In other words, the valve assembly remains in a closed attitude in which the system is pressurized only to the left of the diaphragm. As perhaps shown best in FIGS. 3 and 4, the hemispherical surface 34 covers significantly greater surface area than do the areas defined by the annuluses 40 and, thereby, the diaphragm remains, when in the closed attitude, in a fully supported and stabilized condition which prevents it from being shifted in such a fashion as to cause leakage beyond the diaphragm. Thus, the valve assembly remains sealed and no such leakage occurs. This is entirely different than in conventional valve assemblies as heretofore described wherein such leakage is, not only common, but constant.

When the electrical system, not shown, connected in operating relation to the electric solenoid 128 activates the electric solenoid under the control of the timer or other controlling mechanism, the electric solenoid operates to withdraw the valve member 130 from the valve seat 125. As previously described, this establishes the path of fluid movement from the spring chamber 88 into the main fluid passage 30 on the right of the diaphragm 42 as shown in FIG. 3. Since the main fluid passage on the right of the diaphragm is not pressurized and the spring chamber 88 is pressurized, fluid under pressure passes along the path into the main fluid passage on the right of the diaphragm. While fluid under pressure is still entering the spring chamber through the diagonal fluid passage 105, the diameter of the diagonal fluid passage 127 is sufficiently greater that fluid pressure drops within the spring chamber to such an extent as to permit fluid pressure within the main fluid passage on the left of the diaphragm, as viewed in FIG. 3, to override action of the spring assembly 85 and remaining fluid pressure within the spring chamber. This causes the diaphragm 42 to lift from the web 41 between the annuluses 40 and thereby open the main fluid passage through the valve assembly over the web and beneath the diaphragm.

Adjustment of the manual control assembly 100 and electric solenoid assembly 120 permits the valve assembly to be controlled so as to reach the desired extent of opening. The range of such opening is complete from the closed attitude shown in FIG. 3 to the fully opened attitude shown in FIG. 5. This is, of course, a function of the degree of imbalance between the fluid pressures involved as controlled by the volume of fluid passing into the spring chamber through the diagonal fluid passage 105 and the volume of fluid exiting the spring chamber through the diagonal fluid passage 127.

Figure 5:
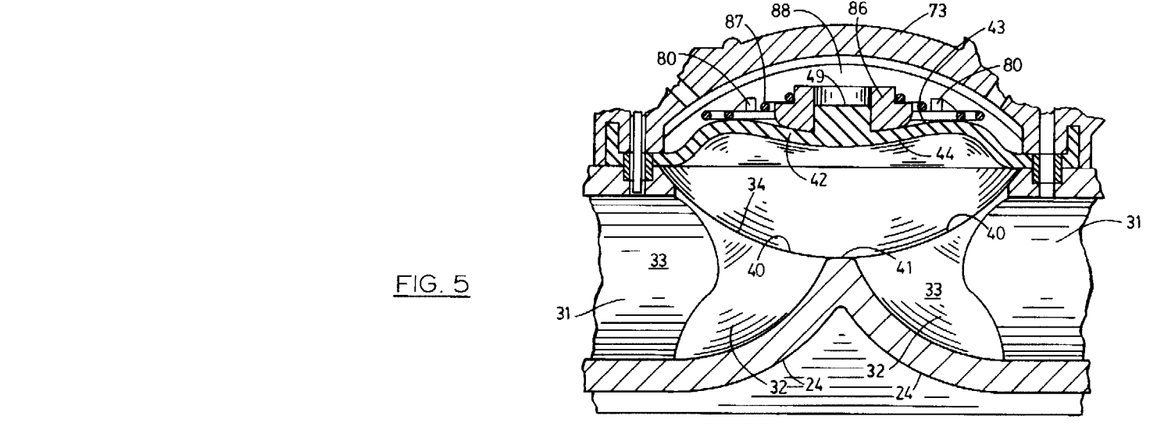
FIG. 5 is a fragmentary, longitudinal vertical section taken from a position indicated by line 3—3 in FIG. 2, but showing the diaphragm in a fully opened attitude.
Figure 6:
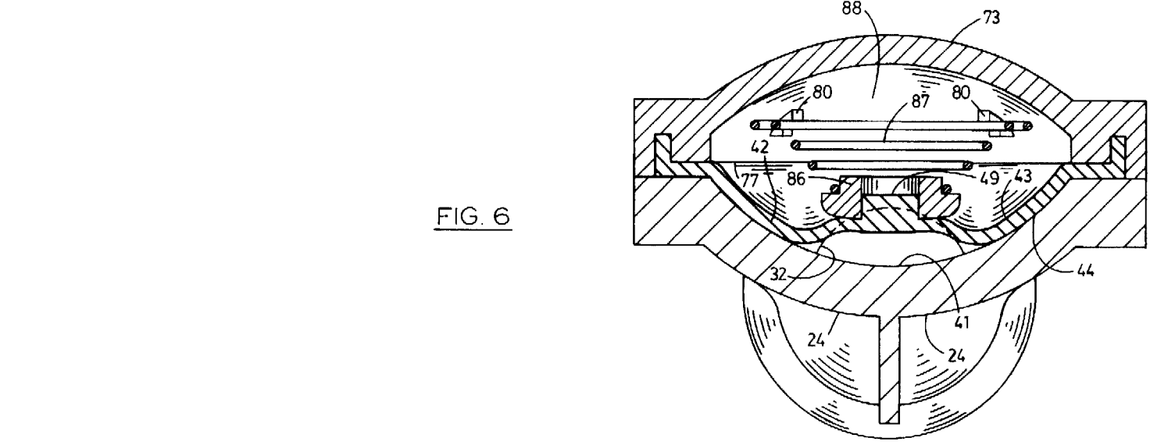
FIG. 6 is a fragmentary, transverse vertical section taken from a position indicated by line 6—6 in FIG. 3, but showing the diaphragm in a partially opened attitude.

As can best be visualized upon reference to FIG. 5, when the diaphragm 42 is moved to the fully opened attitude shown therein, the cross sectional area of the main fluid passage at any given point through the valve assembly is no smaller than the internal diameter of the conduit connected to the valve assembly. As a consequence, there is substantially little pressure drop or pressure loss when the valve is in the fully opened attitude resulting from passage of the fluid through the valve assembly, unlike conventional valve assemblies. Although the vertical distance between the lower surface 44 of the diaphragm and the web 41 is less than the internal diameter of the conduit, the overall area of the main fluid passage at that point is, in fact, greater than the internal diameter of the conduit due to the space defined between the lower surface of the diaphragm and the hemispherical surface 34. In other words, the lateral dimension of the main fluid passage at that point is substantially greater than the diameter of the interior of the conduit.

Where the valve assembly 10 is only opened to a partially opened attitude, such as shown in FIG. 6, it will be seen that the size of the main fluid passage covers a relatively small area of the hemispherical surface 34. This offers a significant benefit, in that the valve assembly can literally be adjusted to nearly infinitely small openings because only a small portion of the diaphragm is involved in opening. This is directly opposite to conventional diaphragm valves where small settings are virtually impossible because the entire diaphragm must move toward or from the valve seat and, therefore, is under constant resistance by the fluid passing through the opening defined thereby. The result in conventional valve assemblies is that the diaphragm develops a "valve chatter" at small settings which essentially prevents such small settings so that once the smallest setting of which the valve is capable is approached, any further movement of the diaphragm causes it to close entirely or to vibrate in such a fashion as not to permit even flow at such a small setting.

Therefore, the valve assembly of the present invention substantially achieves the optimum operational objectives of a fluid valve, in that, when in a normally closed condition, the valve forms a fluid tight seal against fluid passing therebeyond along the fluid line permitting no leakage; it is instantaneously responsive to a predesignated command to open to a fully opened condition such that little or no pressure loss is caused; upon receipt of the predesignated command, it operates instantaneously again to close substantially completely to seal the fluid line through the valve with substantially no fluid leakage; and it can be adjusted to nearly infinitely small or low flow settings beyond the capability conventional valve assemblies.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. A valve assembly adapted more precisely to control the flow of fluid therethrough, in a range of attitudes from a fully closed attitude, in which there is substantially no fluid flow therethrough, to a fully opened attitude, in which there is substantially a predetermined maximum fluid flow therethrough, the valve assembly comprising:

A. a valve housing enclosing valve chamber bounded on one side by a concave valve seat defining a substantially hemispherical surface and on an opposite side by a pressure surface;

B. an inlet coupling mounted on the valve housing defining a main inlet passage extending into the valve housing and communicating with the valve chamber through an annulus bounding an inlet opening extending through said valve seat;

C. an outlet coupling mounted on the valve housing defining a main outlet passage opposite said inlet passage extending from the valve housing and communicating with the valve chamber through an annulus bounding an outer opening extending through said valve seat in laterally spaced relation to said inlet opening;

D. a flexible valve member mounted in the valve chamber of the valve housing having, in an at rest condition, a convex substantially hemispherical surface substantially identical to said valve seat and, in said fully closed attitude, disposed in facing engagement with said substantially hemispherical surface of the valve seat in substantially fluid sealing relation to said inlet and outlet openings at said annuluses and having a central portion adapted to involute as the valve member is moved from said fully closed attitude toward said fully opened attitude and wherein the valve member has an upper surface facing said pressure surface of the valve housing and defining, within the valve chamber between said upper surface of the valve member and said pressure surface of the valve housing, a pressure chamber, and E. a fluid control system communicating with said pressure chamber including 1) an inlet control passage interconnecting said main inlet passage and said pressure chamber of the valve housing having a given maximum volume of fluid flow per period of operation, 2) an outlet control passage interconnecting said pressure chamber of the valve housing and said main outlet passage having a given maximum volume of fluid flow per period of operation which is greater than that of the inlet control passage, and 3) means for selectively controlling the fluid flow through said inlet and outlet control passages selectively to control fluid pressure within the pressure chamber to move the valve member to a selected attitude within said range of attitudes, whereby said central portion of the convex substantially hemispherical surface of the valve member, in moving from said fully closed attitude to said selected attitude, is involuted to define, with said substantially hemispherical surface of the valve seat, a fluid passage, interconnecting said inlet opening and said outlet opening, of a progressively greater cross sectional area while substantially the remainder of the convex substantially hemispherical surface of the valve member remains in facing engagement with said substantially hemispherical surface of the valve seat as said selected attitude is approached.

2. The valve assembly of claim 1 including a spring assembly received in said pressure chamber between said upper surface of the valve member and said pressure surface of the valve housing operable to assist said fluid control system in returning the valve member to said fully closed attitude.

* * * * *

UNITED STATES PATENT AND TRADEMARK OFFICE
CERTIFICATE OF CORRECTION

PATENT NO. : 5,632,465
DATED : May 27, 1997
INVENTOR(S) : Paul M. Cordua

It is certified that error appears in the above-identified patent and that said Letters Patent is hereby corrected as shown below:

Column 7, Line 10, delete "fight" and substitute --right--.

Signed and Sealed this

Fifteenth Day of July, 1997

BRUCE LEHMAN

Attest:

Attesting Officer

Commissioner of Patents and Trademarks